E. L. MÜLLER AND F. SIEGHEIM.
STONEWORKING MACHINE.
APPLICATION FILED NOV. 25, 1913. RENEWED MAY 4, 1920.

1,359,615.

Patented Nov. 23, 1920.
3 SHEETS—SHEET 1.

Witnesses:
Elsie Swenson
Wm. A. Courtland

Inventors:
Eugen Ludwig Müller & Fritz Siegheim
by
Attorneys

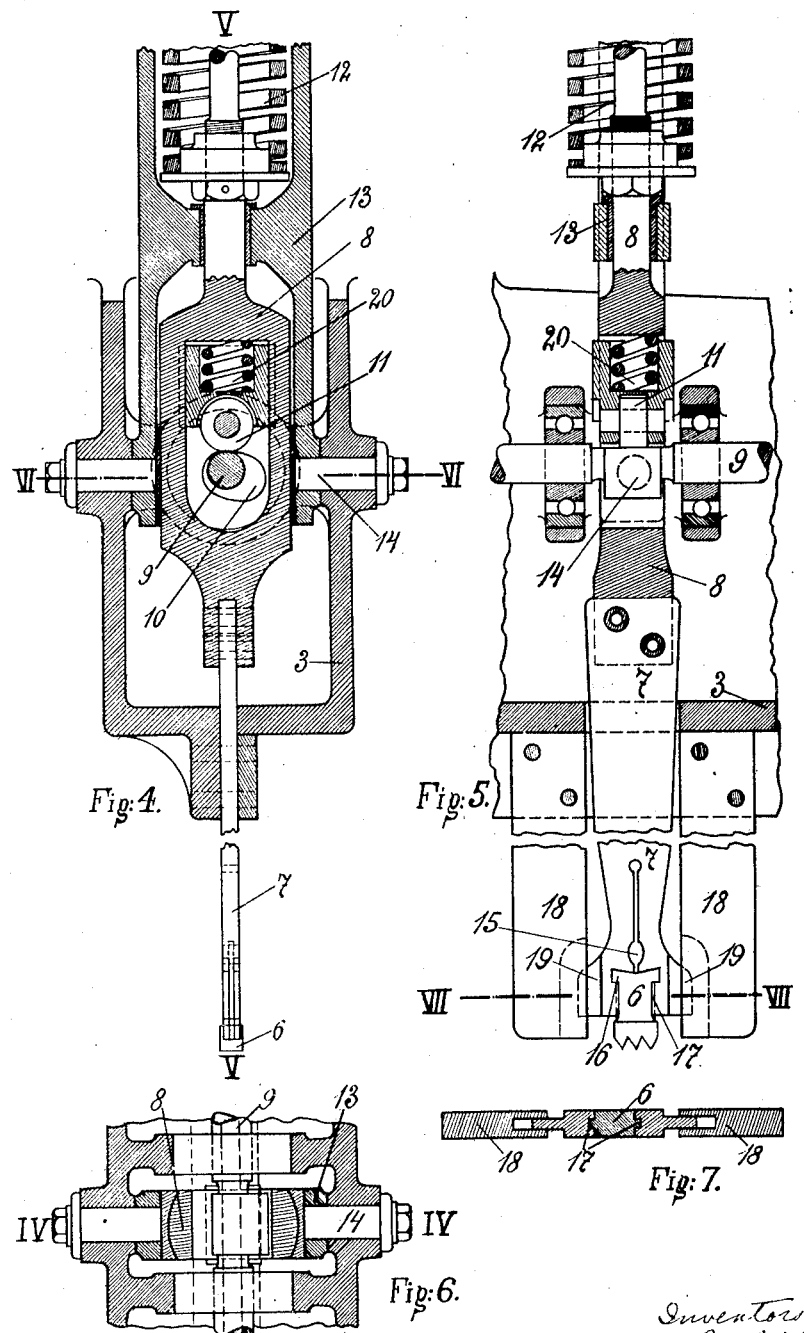

E. L. MÜLLER AND F. SIEGHEIM.
STONEWORKING MACHINE.
APPLICATION FILED NOV. 25, 1913. RENEWED MAY 4, 1920.
1,359,615.
Patented Nov. 23, 1920.
3 SHEETS—SHEET 3.
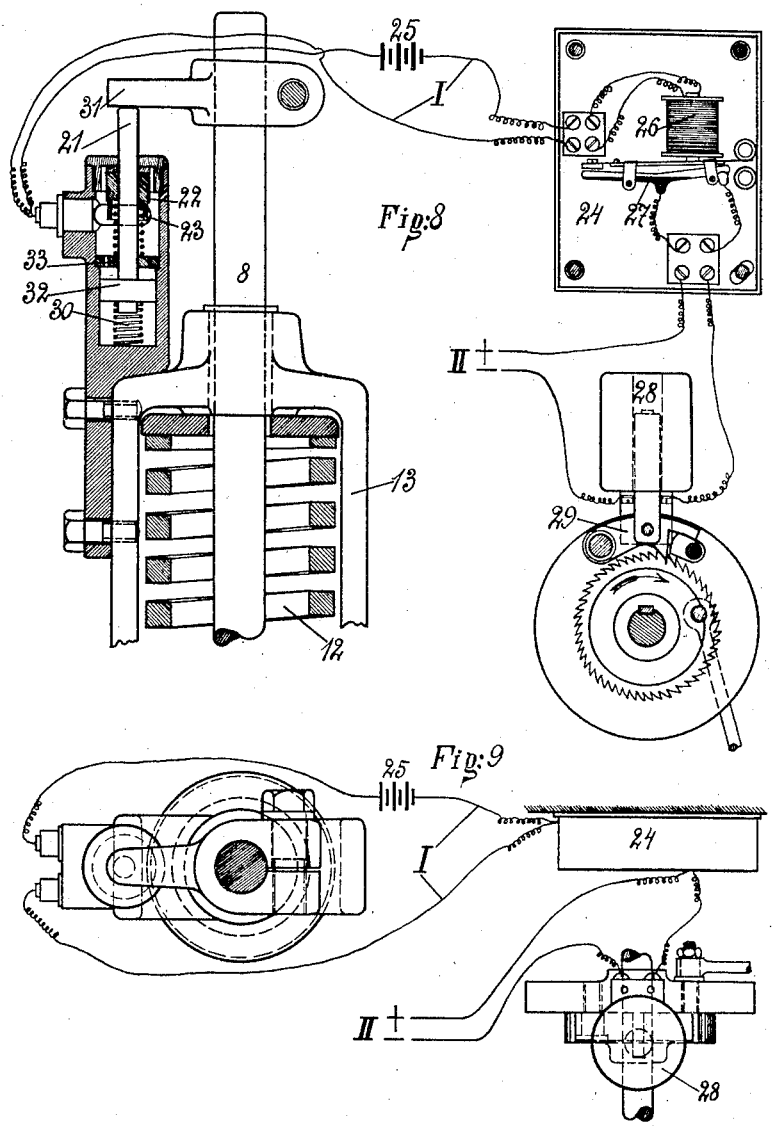

UNITED STATES PATENT OFFICE.

EUGEN L. MÜLLER, OF SCHÖNEBERG, AND FRITZ SIEGHEIM, OF WILMERSDORF, NEAR BERLIN, GERMANY.

STONEWORKING-MACHINE.

1,359,615.  Specification of Letters Patent.  Patented Nov. 23, 1920.

Application filed November 25, 1913, Serial No. 802,932. Renewed May 4, 1920. Serial No. 378,858.

*To all whom it may concern:*

Be it known that we, EUGEN LUDWIG MÜLLER and FRITZ SIEGHEIM, subjects of the German Emperor, and residing, respectively, at Schöneberg and Wilmersdorf, near Berlin, Germany, have invented certain new and useful Improvements in Stoneworking-Machines, of which the following is a specification.

This invention relates to a stone-working machine in which the tool has imparted to it a reciprocating cutting movement, and in which the work-piece and hammer-apparatus have a relative motion. The invention consists in flexibly connecting the hammer-apparatus with the machine-frame so that it can yield to obstacles and then return into its normal working position, and in guiding the tool in an improved manner.

One embodiment of the invention is represented by way of example in the accompanying drawings, wherein:—

Figure 1 is a side elevation

Fig. 2 a front elevation, and

Fig. 3 a top plan view of the machine,

Fig. 4 is a section, enlarged, taken on the line IV—IV in Fig. 6 showing a spring hammer with its driving mechanism and tool, Fig. 5 is a section taken on the line V—V in Fig. 4, Fig. 6 is a section taken on the line VI—VI in Fig. 4, and Fig. 7 is a section, enlarged, taken on the line VII—VII in Fig. 5;

Fig. 8 is a side elevation showing a device for automatically feeding the support from the side, and Fig. 9 is a top plan view thereof.

Figure 1:
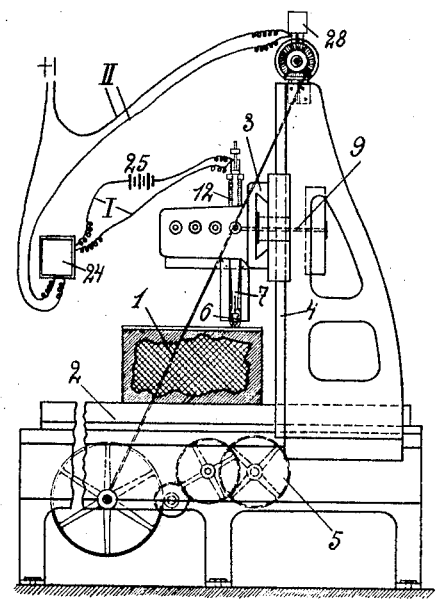
Figure 2:
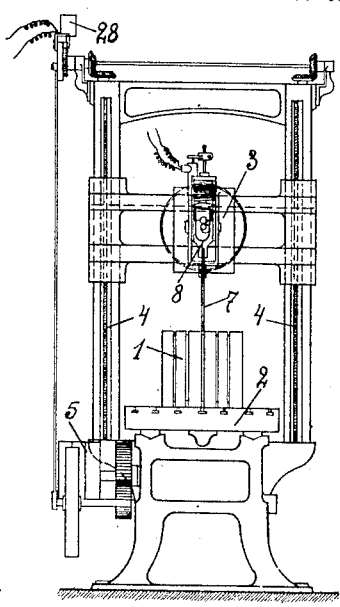
Figure 3:
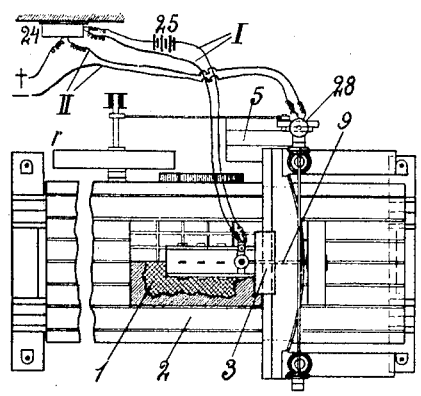

Referring to the drawings, the work-piece 1 is set up on the machine-bed 2. The rest or slide 3 is guided in known manner on two columns 4 in such manner that it can be moved up and down. The bed is driven by belt-pulleys 5 in the manner customary in planing machines.

The tool 6 is clamped in the tool-holder 7. This tool-holder is rigidly connected with the spindle 8 to which a reciprocating motion is imparted by the driving shaft 9. For this purpose a cam 10 is fastened for each spindle on the driving shaft, each of which cams coacts with an anti-friction roller 11 on the spindle in such manner that the latter is moved upward by the cam, whereas it is moved downward by the strong spring 12.

The stone is worked substantially by chipping off material. It frequently happens, however, that the material does not splinter off at some places, but the chisel jams. This causes the chisel to break or at least to be greatly worn. For obviating this drawback the arrangement is such that when the tool impacts on the stone and during the time when it remains on the stone the tool can move with the work-piece. This is effected by arranging the spindle 8 longitudinally movable in a yoke 13 which is mounted to rock about the trunnions 14 in the support 3. Consequently, when the chisel impacts on the work-piece and the roller is lifted from the cam, the rocking system is free from this moment. The vertical position is obtained only by the renewed contact of the cam with the anti-friction roller. It is not necessary that the rocking system shall become completely free by the impact of the tool on the work-piece, as in the embodiment. It suffices when the spindle is kept always vertical by employing springs other than the main driving spring.

The tool 6 is elastically held in the tool-holder. For this purpose the tool-holder is slotted at its free end and by inserting a suitably shaped tool the hole 15 can be opened so far that the tool can be exchanged.

The tool 6 is prevented by the projections 16 from being thrown out of its holder and it is prevented by the ribs 17 from being turned and shifted laterally.

When the tool works in the work-piece, in consequence of the uneven nature of the stone and the uneven wear of the tool, lateral stresses are set up which tend to force the tool toward one side. For taking up these lateral stresses special guides are provided consisting of guide-bars 18 which are attached to the slide 3 and participate in such manner in its movement that they are lowered with the tool-holder into the groove in the stone. For this purpose the tool-holder is provided with lateral lugs 19 which work in corresponding grooves in the guide-bars 18.

The spring spindle is driven by the shaft 9 on which a cam 10 is provided for each spindle. When the shaft is rotated these cams press the spindle 8 by means of the anti-friction roller 11 against the pressure spring 12 which is arranged in the yoke 13 and drives the spindle downward. The cam is designed so that even when the machine is run idle at the maximum speed the roller remains in contact with the cam. Accordingly, the curve of the cam is such that the spring 12 imparts to the spindle, at the maximum admissible speed, the theoretically possible acceleration without braking. At a lower speed of the driving shaft the roller is of course pressed against the cam with a pressure which is greater, the less the speed of the driving shaft. Accordingly, the vertical velocity of the spindle and with it the amount of kinetic energy of the same, i. e. the force of the blow, is definitely determined by the shape of the cam and the speed of the driving shaft. Accordingly, by varying the speed it is possible to adjust the correct force of the blow for the material being worked.

A saving of power impossible to be realized in machines of the old type is effected by the construction described above, a saving which becomes more and more appreciable as the speed of the driving shaft diminishes, since the energy expended in tensioning the spring is exerted on the cam during the downward stroke of the spindle, thus restoring part of the energy to the driving shaft. Nearly all of the energy will be saved when the machine is running idle for the shape of the cam is such that at the point where, ordinarily, the impact of the blow on the stone would cause the cam and roller to separate, the cam picks up the spindle without shock and, consequently, with a minimum loss of kinetic energy.

In known arrangements, in which the cam moves freely under the roller in the highest position so that the spindle flies downward freely under the action of the spring, without bearing on the cam, the entire blow has to be taken up by buffer springs when running idle. These springs must be of approximately the same dimensions as the spring 12 itself. In the illustrated arrangement the cam strikes against the roller, of course, when the cam lifts the spindle from the stone, because the tool may not impact on the stone only at the end of its stroke. This blow is reduced to about one-tenth of the working blow by suitably shaping the cam on the principle described above. In order to diminish still more the blow of the cam on the roller, a buffer spring 20 is inserted between the roller and the main part of the spindle; this spring distributes over a fairly long time the acceleration to be imparted to the spindle.

Obviously the tool must be fed toward the work-piece as the latter is continuously worked. This feed is preferably effected automatically by its being derived from any suitable moved part of the machine. The material is not worked, however, with the regularity and uniformity of a positively controlled feed, and consequently after working for a certain time conditions will arise when the tool is not fed to the required distance relatively to the work-piece. This want of agreement between the feed and the reduction of material will be a drawback, when the feed is too fast. The tool would then impact too soon on the work-piece, i. e. at a moment when it has not yet acquired the requisite speed. The tool would consequently constantly work away less material, so that at last a time would arrive when it struck no more blows, but would remain stationary on the stone, so that the positive feed must in this case lead to a destruction of the tool.

According to the invention these disadvantages are obviated as described hereinafter with reference to Figs. 8 and 9, a device actuated electrically being shown by way of example.

A stop pin 21 which carries a contact-ring 22 is arranged on a part of the machine which does not participate in the striking movement, for example on the fork 13. As long as this contact-ring is located between the contact-jaws 23 the circuit I containing the source of current 25 is closed. This circuit also contains a coil 26 which holds a mercury contact 27, a tube filled with mercury, in such a position that the working circuit II is open. When the ring 22 issues from the jaws 23 and thereby breaks the primary circuit I, the mercury contact 27 closes the working circuit II. The coil 28 in the working circuit draws its iron core upward, lifts the pawl 29 connected with it and thereby stops the feed of the slide 3.

A spring 30 always tends to press the pin 21 into such a position that the circuit breaker 22, 23 is open, whereas, a tappet 31 fast on the hammer drives the pin 21 into its circuit-closing position. If no special arrangement were made this arrangement would cause a rapid succession of current impulses in the circuit I which would not be adapted to keep the contact 27 in its upper position. In order to convert this series of current impulses into a constant flow of current the pin 21 is connected with the piston 32 of a dash-pot which allows the pin 21 and with it the ring 22 to rise so slowly that the circuit breaker is not opened between two successive blows. By suitably positioning the tappet 31 relatively to the jaws 23 and suitably dimensioning the spring 30 and the hole 33 in the dash-pot it is possible to stop the feed at any desired height of blow. For example, if the entire stroke of the spindle is 15 mm. and the spindle is to impact on the stone at 12 mm., the described disconnecting device will preferably operate between 10 and 11 mm. It will be readily understood that this arrangement can be used for any desired number of spindles when the same are connected in series in circuit I.

When working blocks of rock by means of the herein-described machine it is frequently found that they have very irregular faces. Consequently, when the tool begins to work it does not impact uniformly at all parts of its edge on material and it is unevenly worn away, and, in addition, the slanting parts of the surface of the material force the tool away when it begins to work.

These disadvantages are obviated by the unevennesses of the block of rock being wholly or partially equalized by applying a hardening mass. This equalizing material acts not only owing to its hardness, but prevents the stone being shivered because such endangered places are no longer exposed. Cement, concrete, tar concrete or the like is suitable, for example, as equalizing material.

Covering the block with the equalizing material has the additional advantage that it enables the block to be set up more readily.

Further, according to the invention those grooves are made from the first in the equalizing material along which the work-piece is to be worked. The object of these grooves is to prevent the equalizing material itself being broken away. They can be provided in opposite faces of the work-piece, and after a groove has been cut half way through, the work-piece can be turned around and worked in the same plane from the other side. The arrangement of opposite grooves has the additional advantage that it prevents large splinters of stone breaking off toward the end of the cuts.

We claim—

1. In a stone working machine in which the tool has a continuous reciprocating motion for chipping the workpiece, the combination of a positive lifting member, a tool-carrying spindle engaging said member loosely so as to be capable of lateral movement thereon and spring mechanism for tending to hold the contact surface of said member and spindle together and to restore the spindle to normal position when deflected laterally.

2. A machine such as specified in claim 1 having a yoke for carrying said spring mounted to rock in the reciprocating plane of the tool spindle.

3. A machine such as specified in claim 1 having grooved guide bars extending adjacent to the tool end of the tool spindle and engaging therewith.

4. A machine such as specified in claim 3 in which said guide bars and spindle are respectively provided with grooves and guide lugs adjacent to the tool end of the spindle, the bottoms of the grooves being of greater distance apart than are the outer edges of the lugs, so as to permit relative movement between the spindle and the guide bars in the direction of relative feed movement of the tool and workpiece.

5. A machine such as specified in claim 1 having a rotating cam for positively lifting the tool from the workpiece, a tool-carrying spindle engaging said cam loosely so as to rock in the direction of relative feed of tool and workpiece, a yoke pivotally supported to rock in a plane normal to the plane of rotation of said cam, and a spring mounted in said yoke for holding the spindle and cam in contact.

In testimony whereof, we affix our signatures in the presence of two witnesses.

EUGEN L. MÜLLER.
FRITZ SIEGHEIM.

Witnesses:
WOLDEMAR HAUPT,
HENRY HASPER.